(12) United States Patent
Yamada et al.

(10) Patent No.: US 11,046,127 B2
(45) Date of Patent: Jun. 29, 2021

(54) TIRE CONDITION DETECTING DEVICE, CLAMP-IN VALVE, AND TIRE VALVE UNIT

(71) Applicant: PACIFIC INDUSTRIAL CO., LTD., Ogaki (JP)

(72) Inventors: Hirohisa Yamada, Yamagata (JP); Hirotake Mori, Mizuho (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 433 days.

(21) Appl. No.: 15/753,640

(22) PCT Filed: Dec. 26, 2016

(86) PCT No.: PCT/JP2016/088723
§ 371 (c)(1),
(2) Date: Feb. 20, 2018

(87) PCT Pub. No.: WO2018/122924
PCT Pub. Date: Jul. 5, 2018

(65) Prior Publication Data
US 2020/0207165 A1 Jul. 2, 2020

(51) Int. Cl.
*B60C 23/04* (2006.01)
*F16K 15/20* (2006.01)

(52) U.S. Cl.
CPC .......... *B60C 23/0494* (2013.01); *F16K 15/20* (2013.01); *Y10T 137/3662* (2015.04)

(58) Field of Classification Search
CPC ...................... Y10T 137/3662; B60C 23/0494
USPC ........................................................ 73/146.8
See application file for complete search history.

(56) References Cited

U.S. PATENT DOCUMENTS 5,844,131 A * 12/1998 Gabelmann ............. B60C 23/04
73/146.8
6,005,480 A 12/1999 Banzhof et al.
6,163,255 A 12/2000 Banzhof et al.
(Continued)

FOREIGN PATENT DOCUMENTS

DE 29623466 U1 7/1998
EP 1386759 A1 4/2004
(Continued)

OTHER PUBLICATIONS

International Search Report, dated Jan. 7, 2009; International Application No. PCT/DE2009/000239; 9 pages.
(Continued)

*Primary Examiner* — Robert K Arundale
(74) *Attorney, Agent, or Firm* — Cantor Colburn LLP (57) ABSTRACT

A tire condition detecting device includes a case, a detecting section, which is accommodated in the case to detect a condition of a tire, an attachment portion provided in the case, an insertion hole, which is provided in the attachment portion and is configured to allow a snap-in valve to be inserted into the insertion hole, and a case-side fitting portion, which is provided in the attachment portion to be positioned outward of the insertion hole in a direction orthogonal to a central axis of the insertion hole, and is configured to be fitted to a clamp-in valve. The snap-in valve inserted into the insertion hole or the clamp-in valve fitted to the case-side fitting portion is attached to the case with a fixing tool.

6 Claims, 7 Drawing Sheets

(56) References Cited

U.S. PATENT DOCUMENTS

| | | | | |
|---|---|---|---|---|
| 6,722,409 | B1* | 4/2004 | Martin | B60C 23/0408 152/415 |
| 7,536,904 | B1* | 5/2009 | Yu | B60C 23/0408 73/146 |
| 2002/0046599 | A1* | 4/2002 | Chuang | B60C 23/0408 73/146 |
| 2003/0066343 | A1* | 4/2003 | Fischer | B60C 23/0494 73/146 |
| 2004/0119584 | A1* | 6/2004 | Kayukawa | B60C 23/0494 340/445 |
| 2007/0062268 | A1* | 3/2007 | Blossfeld | B60C 23/0494 73/146.8 |
| 2007/0295076 | A1 | 12/2007 | Blossfeld et al. | |
| 2008/0127724 | A1* | 6/2008 | Qiu | B60C 23/0494 73/146.8 |
| 2008/0250852 | A1* | 10/2008 | Capdepon | B60C 23/0494 73/146.8 |
| 2010/0024539 | A1* | 2/2010 | Hamm | B60C 23/0408 73/146.5 |
| 2010/0326180 | A1 | 12/2010 | Nagora et al. | |
| 2011/0272038 | A1* | 11/2011 | Falkenborg | B60C 23/0496 137/224 |
| 2012/0017672 | A1* | 1/2012 | Uh | B60C 23/0494 73/146.8 |
| 2012/0103483 | A1* | 5/2012 | Cazzanti | B60C 29/02 152/152.1 |
| 2012/0118057 | A1 | 5/2012 | Rigney et al. | |
| 2012/0137763 | A1* | 6/2012 | Falkenborg | B60C 29/064 73/146.8 |
| 2013/0009762 | A1* | 1/2013 | Yu | B60C 23/0494 340/442 |
| 2013/0233068 | A1* | 9/2013 | Choe | B60C 29/02 73/146.3 |
| 2013/0333459 | A1* | 12/2013 | Yu | B60C 23/0494 73/146.8 |
| 2014/0311233 | A1* | 10/2014 | Yu | B60C 23/0494 73/146.8 |
| 2014/0318231 | A1* | 10/2014 | Lo | B60C 23/0496 73/146.8 |
| 2014/0331759 | A1* | 11/2014 | Chen | G01L 17/00 73/146.5 |
| 2015/0068297 | A1 | 3/2015 | Duffy et al. | |
| 2015/0090025 | A1* | 4/2015 | Huang | B60C 23/0494 73/146.8 |
| 2015/0183278 | A1* | 7/2015 | Jankowski | B60C 23/0494 73/146.8 |
| 2015/0183281 | A1* | 7/2015 | Deniau | B60C 23/0494 73/146.8 |
| 2015/0210126 | A1* | 7/2015 | Arnoldo | G01L 17/005 73/146.5 |
| 2015/0273957 | A1* | 10/2015 | Kempf | B60C 23/0496 73/146.8 |
| 2015/0375582 | A1 | 12/2015 | Chen | |
| 2015/0375583 | A1* | 12/2015 | Chen | B60C 23/0494 152/427 |
| 2016/0096404 | A1* | 4/2016 | Gorenzweig | B60C 23/0494 73/146.8 |
| 2016/0167463 | A1* | 6/2016 | Gout | B60C 23/0494 73/146.3 |
| 2016/0178075 | A1* | 6/2016 | Chen | B60C 29/005 137/227 |
| 2016/0303929 | A1* | 10/2016 | Deniau | B25B 27/0078 |
| 2019/0217672 | A1* | 7/2019 | Li | B60C 23/04 |
| 2019/0270351 | A1* | 9/2019 | Peedikakkandy | B60C 29/02 |
| 2020/0009926 | A1* | 1/2020 | Capdepon | B60C 23/0494 |

FOREIGN PATENT DOCUMENTS

| | | |
|---|---|---|
| EP | 3225432 A1 | 4/2017 |
| FR | 2894518 A1 | 6/2007 |
| JP | 2000033808 A | 2/2000 |
| JP | 2011513123 A | 4/2011 |
| WO | 2008064869 A1 | 8/2008 |
| WO | 2016102111 A1 | 6/2016 |

OTHER PUBLICATIONS

Search Report issued in EP Application No. 16913632.2-1012 dated Dec. 4, 2019; 7 pages.

Notice of Reasons for Refusal and English Translation of Notice issued in Japanese Patent Application No. 2017-566880, dated Jun. 5, 2020; 6 pages.

* cited by examiner

TIRE CONDITION DETECTING DEVICE, CLAMP-IN VALVE, AND TIRE VALVE UNIT

TECHNICAL FIELD

The present invention relates to a tire condition detecting device, a clamp-in valve, and a tire valve unit.

BACKGROUND ART

There is known a tire condition monitoring device that monitors a tire condition, such as air pressure, of a tire mounted on a wheel. The tire condition monitoring device includes a receiver and tire valve units each mounted on a wheel of a vehicle. The tire valve unit includes a tire condition detecting device and a tire valve attached to the tire condition detecting device. The tire condition detecting device includes a detecting section that detects a tire condition and a case that accommodates the detecting section.

Tire valves mainly include two types: a snap-in valve and a clamp-in valve. The snap-in valve includes a valve stem made of metal and a body portion made of rubber provided around the outer circumference of the valve stem. The opposite ends of the valve stem project from the body portion. When a tire valve unit including a snap-in valve is mounted on a wheel, the snap-in valve is pressed into an attachment hole provided in the wheel. This allows the body portion to be brought into close contact with the inner surface of the attachment hole, and the tire valve unit is mounted on the wheel.

The clamp-in valve includes a valve stem made of metal. The valve stem of the clamp-in valve includes a flange portion and a fastening portion. The fastening portion is positioned near one axial end of the valve stem. The fastening portion includes a thread groove provided in the outer circumferential surface of the valve stem. The flange portion is positioned closer to one axial end of the valve stem than the fastening portion. When a tire valve unit including the clamp-in valve is mounted on a wheel, the clamp-in valve is inserted into an attachment hole provided in the wheel. At the time, a grommet is sandwiched between the flange portion and the wheel. Then, a fastening nut is screwed onto the fastening portion passed through the attachment hole so that the wheel is sandwiched by the fastening nut and the flange portion. This allows the tire valve unit to be mounted on the wheel.

Patent Document 1 describes a tire condition detecting device to which both of a snap-in valve and a clamp-in valve can be individually attached as tire valves. The tire condition detecting device described in Patent Document 1 includes a case that is provided with an attachment portion. The attachment portion includes an insertion hole that is recessed from the outer surface of the case to the inner surface of the case. When the snap-in valve is used as a tire valve, a part of the valve stem that projects from the body portion is inserted into the insertion hole of the attachment portion. Then, a fixing tool restricts the snap-in valve from coming off the insertion hole with a part of the valve stem inserted into the insertion hole, so that the tire condition detecting device and the snap-in valve are integrated. Even when the clamp-in valve is used as a tire valve, one end of the valve stem of the clamp-in valve is inserted into the insertion hole as with the case of the snap-in valve. Then, a fixing tool restricts the clamp-in valve from coming off the insertion hole.

PRIOR ART DOCUMENT

Patent Document

Patent Document 1: Japanese National Phase Laid-Open Patent Publication No. 2011-513123

SUMMARY OF THE INVENTION

Problems That the Invention is to Solve

In the tire condition detecting device described in Patent Document 1, not only when the snap-in valve is used, but also when the clamp-in valve is used, a part of each valve is inserted into the same insertion hole. Thus, in the snap-in valve and the clamp-in valve, the part to be inserted into the insertion hole is manufactured to have the same outline shape.

When the snap-in valve is used, it is desired that the tire valve unit be reduced in weight to reduce the force acting on the body portion during rotation of the wheel. If the part of the snap-in valve to be inserted into the insertion hole is made thin, the tire valve unit will be reduced in weight. However, if the part of the snap-in valve to be inserted into the insertion hole is made thin, the part of the clamp-in valve to be inserted into the insertion hole will also be made thin to have the same shape as that of the snap-in valve. If the part of the clamp-in valve to be inserted into the insertion hole is made thin, the force acting on the attachment portion will increase when the fastening nut is fastened to the fastening portion, thereby causing deformation of the attachment portion, for example.

It is an object of the present invention to provide a tire condition detecting device, a clamp-in valve, and a tire valve unit that are capable of reducing deformation of an attachment portion to which a clamp-in valve and a snap-in valve can be attached.

Means for Solving the Problems

To achieve the foregoing objective, a tire condition detecting device is provided that includes a case, a detecting section, which is accommodated in the case to detect a condition of a tire, an attachment portion provided in the case, an insertion hole, and a case-side fitting portion. The insertion hole is provided in the attachment portion and is configured to allow a snap-in valve to be inserted into the insertion hole. The case-side fitting portion is provided in the attachment portion to be positioned outward of the insertion hole in a direction orthogonal to a central axis of the insertion hole, and is configured to be fitted to a clamp-in valve. The snap-in valve inserted into the insertion hole or the clamp-in valve fitted to the case-side fitting portion is attached to the case with a fixing tool.

When the snap-in valve is attached to the tire condition detecting device, the snap-in valve is attached to the case while being inserted into the insertion hole. When the clamp-in valve is attached to the tire condition detecting device, the clamp-in valve is attached to the case while being fitted to the case-side fitting portion. Thus, both of the clamp-in valve and the snap-in valve can be individually attached to the case by using one attachment portion.

When the clamp-in valve is mounted on a wheel, a fastening nut is fastened to the clamp-in valve. Then, torsion torque is caused in the clamp-in valve. This torsion torque applies force to the attachment portion from the clamp-in valve. The force applied to the attachment portion from the clamp-in valve decreases as the distance from a central axis of the clamp-in valve increases. The case-side fitting portion is positioned outside the insertion hole in a direction orthogonal to the central axis of the insertion hole, and thus is brought into contact with the case at a position farther away from the central axis of the clamp-in valve than that in a case in which the clamp-in valve is inserted into the insertion hole. As compared with a case in which the clamp-in valve is attached to the case while being inserted only into the insertion hole, it is possible to reduce the force applied to the attachment portion from the clamp-in valve when the fastening nut is fastened. Thus, deformation of the attachment portion is reduced.

To achieve the foregoing objective, a clamp-in valve configured to be attached to a tire condition detecting device is provided. The tire condition detecting device includes a case, a detecting section, which is accommodated in the case to detect a condition of a tire, an attachment portion provided in the case, an insertion hole, and a case-side fitting portion. The insertion hole is provided in the attachment portion and is configured to allow a snap-in valve to be inserted into the insertion hole. The case-side fitting portion is provided in the attachment portion to be positioned outward of the insertion hole in a direction orthogonal to a central axis of the insertion hole. The clamp-in valve includes a valve-side fitting portion configured to be fitted to the case-side fitting portion. The clamp-in valve is configured to be attached to the case with a fixing tool with the case-side fitting portion and the valve-side fitting portion fitted to each other.

The clamp-in valve is attached to the attachment portion with the valve-side fitting portion of the clamp-in valve and the case-side fitting portion of the case fitted to each other. The case-side fitting portion is positioned outside the insertion hole in a direction orthogonal to the axial direction of the insertion hole. Thus, the valve-side fitting portion is brought into contact with the case at a position farther away from the central axis of the clamp-in valve than the insertion hole. As a result, the force acting on the attachment portion from the clamp-in valve is reduced as compared with a case in which the clamp-in valve is inserted only into the insertion hole. That is, using the clamp-in valve capable of reducing the force applied to the attachment portion results in reduction in deformation of the attachment portion of the tire condition detecting device.

The clamp-in valve preferably includes an insertion portion configured to be inserted into the insertion hole.
This allows the force applied to the case from the clamp-in valve to act on the inner surface of the insertion hole from the outer surface of the insertion portion. Thus, the force acting on the case from the clamp-in valve is dispersed to enable further reduction in deformation of the attachment portion.

To achieve the foregoing objective, a tire valve unit is provided that includes a tire condition detecting device and a tire valve attached to the tire condition detecting device. The tire condition detecting device includes a case, a detecting section, which is accommodated in the case to detect a condition of a tire, an attachment portion provided in the case, an insertion hole, a case-side fitting portion, and a fixing tool. The insertion hole is provided in the attachment portion and is configured to allow a snap-in valve serving as the tire valve to be inserted into the insertion hole. The case-side fitting portion is provided in the attachment portion to be positioned outward of the insertion hole in a direction orthogonal to a central axis of the insertion hole, and is configured to allow a clamp-in valve serving as the tire valve to be fitted to the case-side fitting portion. The fixing tool is configured to fix, to the case, the snap-in valve inserted into the insertion hole or the clamp-in valve fitted to the case-side fitting portion.

This allows the clamp-in valve and the case to be fitted to each other at a position outward of the insertion hole in the direction orthogonal to the central axis of the insertion hole, so that deformation of the attachment portion is reduced.

Effects of the Invention

According to the present invention, it is possible to reduce deformation of the attachment portion to which the clamp-in valve and the snap-in valve can be attached.

MODES FOR CARRYING OUT THE INVENTION

Figure 1:
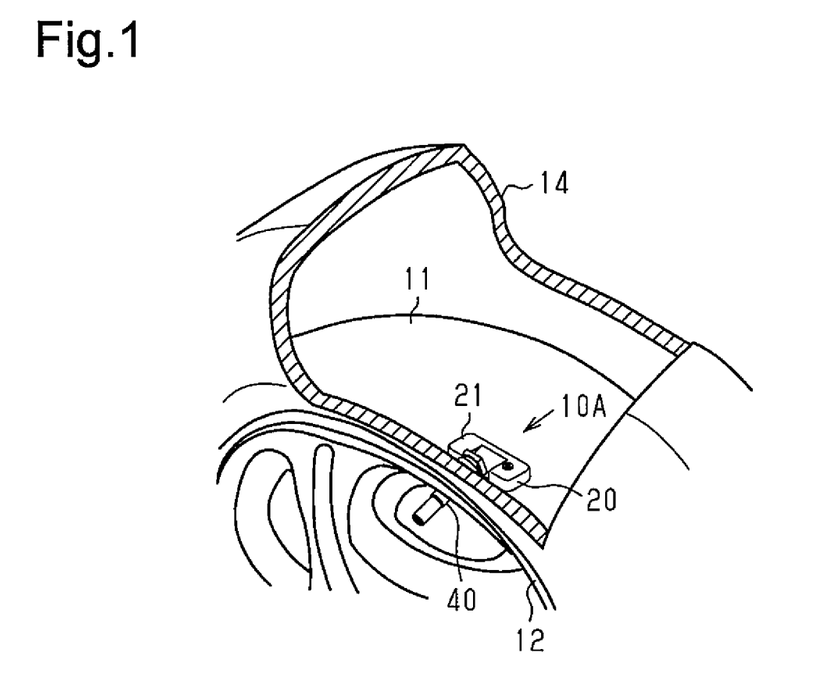
FIG. 1 is a perspective view illustrating a tire valve unit mounted on a wheel.
Figure 2:
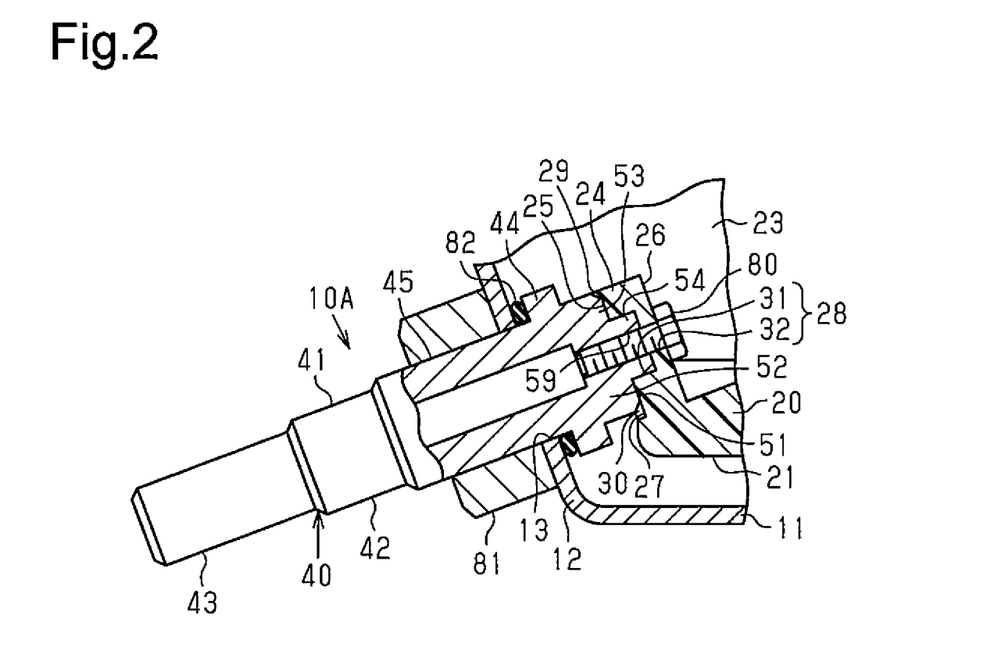
FIG. 2 is a cross-sectional view illustrating the tire valve unit mounted on the wheel.
Figure 3:
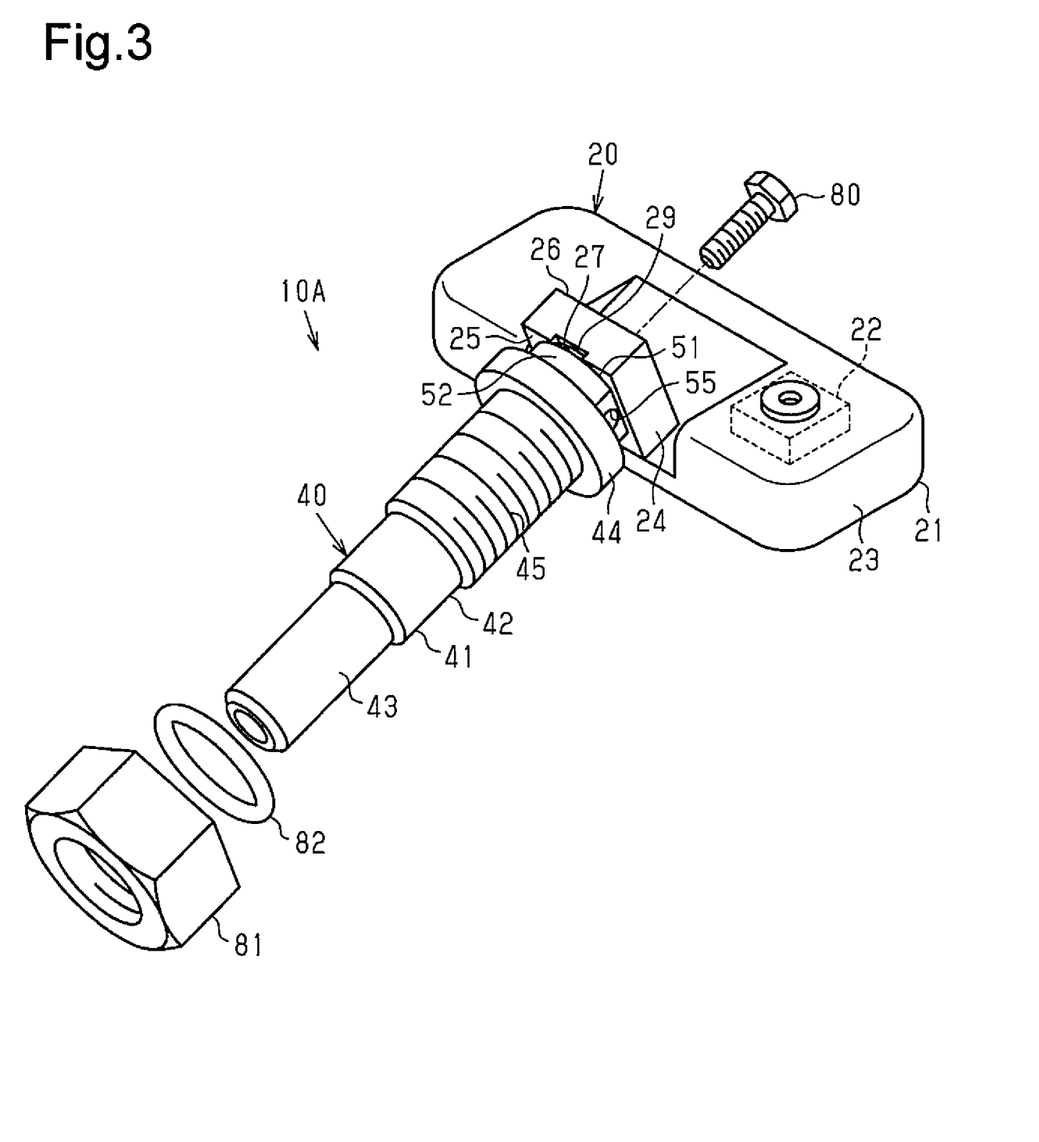
FIG. 3 is a perspective view of the tire valve unit using a clamp-in valve as the tire valve.
Figure 4:
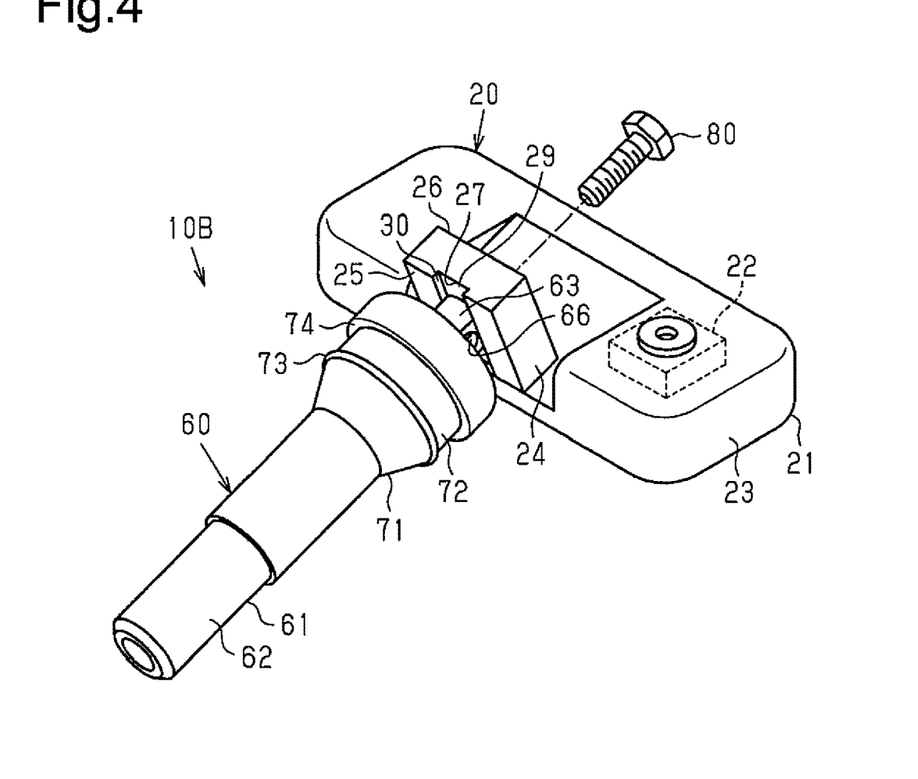
FIG. 4 is a perspective view of the tire valve unit using a snap-in valve as the tire valve.

A tire condition detecting device, a clamp-in valve, and a tire valve unit according to one embodiment will now be described.
As illustrated in FIGS. 1 and 2, a tire valve unit 10A is mounted on a wheel 11. The wheel 11 has a rim 12 provided with a circular attachment hole 13. A tire 14 is attached to the wheel 11.
As illustrated in FIG. 3, the tire valve unit 10A includes a transmitter 20 as a tire condition detecting device, a clamp-in valve 40 attached to the transmitter 20, and a bolt 80 as a fixing tool that fixes the clamp-in valve 40 to the transmitter 20.
As illustrated in FIG. 4, a snap-in valve 60 is attached to the transmitter 20 instead of the clamp-in valve 40 to constitute a tire valve unit 10B including the transmitter 20, the snap-in valve 60, and the bolt 80. The same transmitter 20 is used both in a case in which the snap-in valve 60 is used as a tire valve and a case in which the clamp-in valve 40 is used as a tire valve. That is, the tire valve unit provided with the transmitter 20 and a tire valve includes the clamp-in valve 40 or the snap-in valve 60 as the tire valve.

Figure 5:
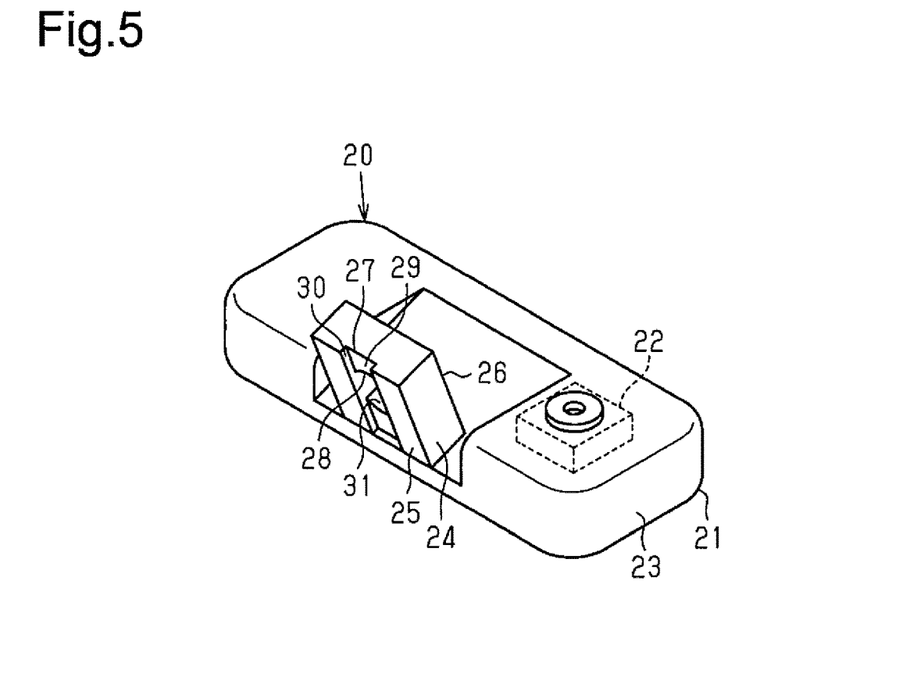
FIG. 5 is a perspective view of a transmitter.

As illustrated in FIG. 5, the transmitter 20 includes a case 21 and a pressure sensor 22 as a detecting section accommodated in the case 21. Although not illustrated, the transmitter 20 includes various electronic components, a battery, an antenna, a transmission circuit, and the like, in the case 21. The transmitter 20 transmits pressure data (air pressure data on the tire 14) detected by the pressure sensor 22 to a receiver. The receiver may be mounted on the vehicle or may be a portable terminal carried by the user. The receiver monitors the pressure in the tire 14, and sends a notification when there is an anomaly in the pressure in the tire 14.

The case 21 is made of plastic, for example. The case 21 includes an accommodation portion (accommodation body) 23 in the shape of a box in which the pressure sensor 22 and the like described above are accommodated, and an attachment portion 24 extending from the accommodation portion 23. The accommodation portion 23 and the attachment portion 24 are integrally molded.

The attachment portion 24 is in the shape of a plate and is provided at its one end in the thickness direction with a first surface 25 and at the other end in the thickness direction with a second surface 26. The attachment portion 24 includes a fitting recess 27 recessed from the first surface 25 toward the second surface 26 in the thickness direction and an insertion hole 28 extending through in the thickness direction. The fitting recess 27 as a case-side fitting portion extends up to the opposite ends of the attachment portion 24 in the extending direction of the attachment portion 24 from the accommodation portion 23, or extends from the proximal end of the attachment portion 24 to the distal end. In the present embodiment, the fitting recess 27 extends throughout the attachment portion 24 in the extending direction. The fitting recess 27 includes a bottom surface 29 parallel to the first surface 25 and two opposed surfaces (inner surfaces) 30 intersecting with the bottom surface 29. The two opposed surfaces 30 are parallel to each other, and the distance between the opposed surfaces 30 is uniform.

Figure 6:
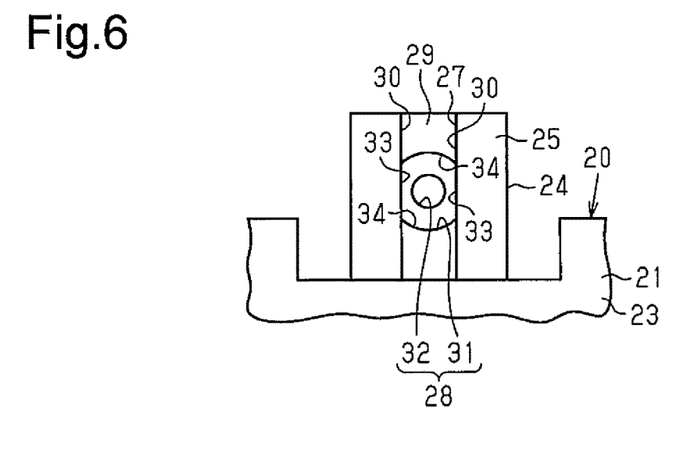
FIG. 6 is a front view of an attachment portion.

As illustrated in FIGS. 2, 5, and 6, the insertion hole 28 extends from the bottom surface 29 of the fitting recess 27 to the second surface 26. The insertion hole 28 communicates with the fitting recess 27. The insertion hole 28 includes a noncircular first hole 31 and a circular second hole 32. The first hole 31 and the second hole 32 are aligned in the axial direction of the insertion hole 28. The first hole 31 opens in the bottom surface 29 of the fitting recess 27, and the second hole 32 opens in the second surface 26. The first hole 31 includes two flat surfaces 33, which are parallel to each other and each positioned in the same plane as the corresponding one of the opposed surfaces 30 of the fitting recess 27, and arcuate curved surfaces 34, which connect the flat surfaces 33 to each other. The flat surfaces 33 and the curved surfaces 34 constitute the inner circumferential surface of the first hole 31. In a direction orthogonal to the central axis of the insertion hole 28, the fitting recess 27 extends outward beyond the insertion hole 28.

Figure 7:
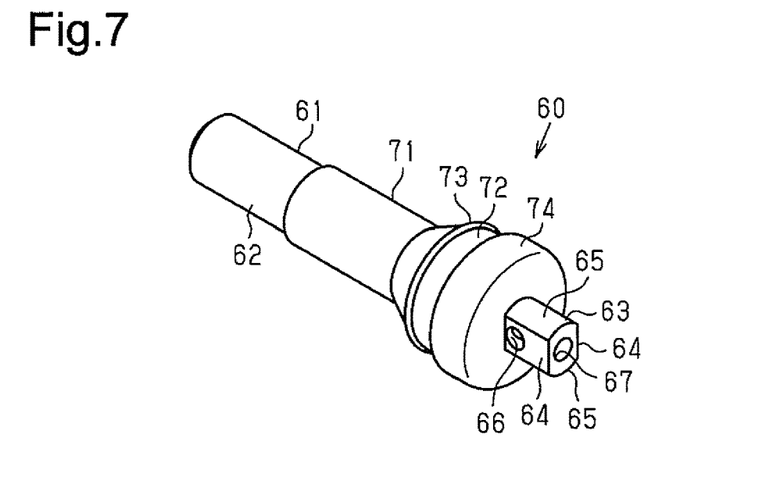
FIG. 7 is a perspective view of a snap-in valve.

As illustrated in FIG. 7, the snap-in valve 60 includes a cylindrical valve stem 61 and a cylindrical body portion 71 provided on the outer circumference of the valve stem 61. The valve stem 61 is made of metal, and the body portion 71 is made of rubber. The valve stem 61 includes a built-in valve mechanism (not illustrated).

The opposite ends of the valve stem 61 project from the body portion 71. One of the opposite ends projecting from the body portion 71 is defined as an outer projecting portion 62, and the other is defined as an inner projecting portion 63. The outer projecting portion 62 is positioned outside the tire 14 when the tire valve unit 10B is mounted on the wheel 11.

The inner projecting portion 63 is positioned inside the tire 14 when the tire valve unit 10B is mounted on the wheel 11.

The outer projecting portion 62 is cylindrical. Although not illustrated, a cap is mounted on the outer projecting portion 62 to prevent entry of foreign matter into the valve stem 61. The inner projecting portion 63 has an outline similar to the shape of the first hole 31 of the insertion hole 28. The inner projecting portion 63 is noncircular and tubular and includes two flat surfaces 64 parallel to each other and two arcuate curved surfaces 65 connecting the flat surfaces 64 to each other. The flat surfaces 64 and the curved surfaces 65 constitute the outer circumferential surface of the inner projecting portion 63. The inner projecting portion 63 is provided in its inner circumference with an internal thread hole 67.

The size of the inner projecting portion 63 a direction orthogonal to the axial direction of the valve stem 61 not only allows the inner projecting portion 63 to be inserted into the first hole 31, but also restricts insertion of the inner projecting portion 63 into the second hole 32 from the first hole 31. In the dimensions of inner projecting portion 63 in the direction orthogonal to the axial direction of the valve stem 61, the longest dimension is less than the diameter of the outer projecting portion 62. That is, the inner projecting portion 63 is thinner than the outer projecting portion 62. The inner projecting portion 63 includes a vent hole 66 extending in the direction orthogonal to the axial direction of the valve stem 61. The vent hole 66 connects the outer circumferential surface of the inner projecting portion 63 and the inner circumferential surface thereof to each other. In the present embodiment, the vent hole 66 opens in each of the flat surfaces 64 of the inner projecting portion 63.

A part of the body portion 71 increases in diameter from the outer projecting portion 62 toward the inner projecting portion 63. A part of the body portion 71 is provided with a mounting groove 72, which is recessed all around the body portion 71. The body portion 71 includes a first holding portion 73 and a second holding portion 74 on the opposite sides of the mounting groove 72 in the axial direction of the valve stem 61. The first holding portion 73 is disposed on the side corresponding to the outer projecting portion 62, and the second holding portion 74 is disposed on the side corresponding to the inner projecting portion 63. The diameter of each of the first holding portion 73 and the second holding portion 74 is greater than the diameter of body portion 71 in the mounting groove 72. Before the tire valve unit 10B is mounted on the wheel 11, the diameter of the body portion 71 in the mounting groove 72 is greater than the diameter of the attachment hole 13.

When the snap-in valve 60 is used as a tire valve used in the tire valve unit, the inner projecting portion 63 of the snap-in valve 60 is inserted into the insertion hole 28 of the attachment portion 24. Then, the bolt 80 inserted into the second hole 32 of the insertion hole 28 is screwed into the internal thread hole 67 of the inner projecting portion 63 to constitute the tire valve unit 10B, in which the transmitter 20 and the snap-in valve 60 are integrated with each other. At this time, each of the flat surfaces 64 of the inner projecting portion 63 is brought into contact with the inner circumferential surface of the first hole 31 to restrict turning of the snap-in valve 60.

Figure 8:
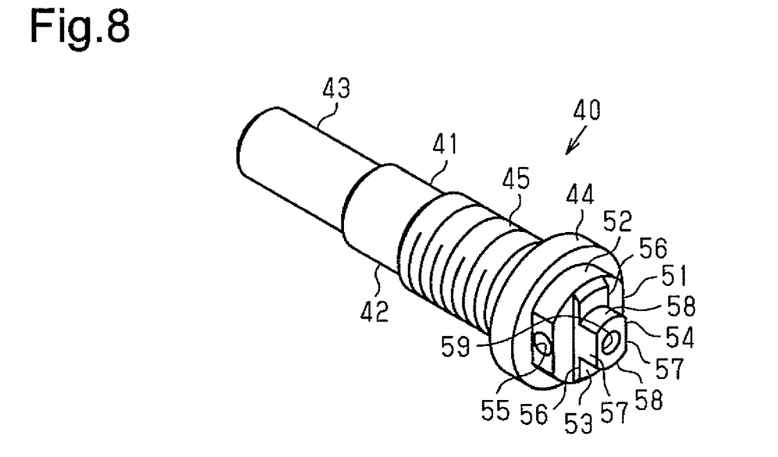
FIG. 8 is a perspective view of a clamp-in valve.

As illustrated in FIG. 8, the clamp-in valve 40 includes a cylindrical valve stem 41. The valve stem 41 is made of metal. The valve stem 41 includes a built-in valve mechanism (not illustrated). The valve stem 41 includes a stem main body 42 and a valve attachment portion 51 integrated with the stem main body 42. The stem main body 42 and the valve attachment portion 51 are aligned in the axial direction of the valve stem 41.

The stem main body 42 is provided at its one axial end with an outer end portion 43 and at its other axial end with a flange portion 44. The stem main body 42 includes a fastening portion 45 between the outer end portion 43 and the flange portion 44 in its axial direction. The outer end portion 43 is positioned outside the tire 14 when the tire valve unit 10A is mounted on the wheel 11. The flange portion 44 is positioned inside the tire 14 when the tire valve unit 10A is mounted on the wheel 11.

Although not illustrated, a cap is mounted on the outer end portion 43 to prevent entry of foreign matter into the valve stem 41. The fastening portion 45 is a portion including a thread groove provided in the outer circumferential surface of the valve stem 41, and serves as an external thread.

As illustrated in FIG. 3, a fastening nut 81 is screwed onto the fastening portion 45. The fastening portion 45 has a diameter that is slightly smaller than the diameter of the attachment hole 13 of the wheel 11. The flange portion 44 is a portion in which the valve stem 41 is locally enlarged in diameter and has a diameter greater than the diameter of the attachment hole 13. That is, the flange portion 44 is restricted from passing through the attachment hole 13.

As illustrated in FIG. 8, the valve attachment portion 51 is continuously provided from the flange portion 44 in the axial direction of the stem main body 42. The valve attachment portion 51 includes a cylindrical continuous portion 52 continuously provided from the flange portion 44, a cylindrical fitting protrusion 53 protruding from an end face of the continuous portion 52 in the axial direction of the valve stem 41, and a tubular insertion portion 54 protruding from the fitting protrusion 53 in the axial direction of the valve stem 41. The continuous portion 52 includes a vent hole 55 extending in a direction orthogonal to the axial direction of the valve stem 41. The vent hole 55 connects the inner circumferential surface and the outer circumferential surface of the continuous portion 52 to each other.

The fitting protrusion 53 as a valve-side fitting portion extends outward beyond the insertion portion 54 in the direction orthogonal to the axial direction of the valve stem 41, or in the radial direction thereof. In the present embodiment, the fitting protrusion 53 extends up to the edge of the continuous portion 52. The fitting protrusion 53 includes two valve-side opposed surfaces 56 intersecting with the continuous portion 52. A part of each valve-side opposed surface 56 is positioned outward of the insertion portion 54 in the direction orthogonal to the axial direction of the valve stem 41. The two valve-side opposed surfaces 56 are parallel to each other. The distance between the valve-side opposed surfaces 56 is slightly less than the distance between the opposed surfaces 30 of the fitting recess 27.

The insertion portion 54 has the same shape as that of the inner projecting portion 63 of the snap-in valve 60 except for the difference in the axial dimensions and except that the vent hole 66 is not provided. Specifically, the insertion portion 54 is noncircular and tubular and includes two flat surfaces 57, which are parallel to each other and are positioned at the same plane as the valve-side opposed surface 56, and two arcuate curved surfaces 58, which connect the flat surfaces 57 to each other. The flat surfaces 57 and the curved surfaces 58 constitute the outer circumferential surface of the insertion portion 54. The insertion portion 54 is provided in its inner circumference with an internal thread hole 59. The size of the insertion portion 54 in the direction orthogonal to the axial direction of the valve stem 41 not only allows the insertion portion 54 to be inserted into the first hole 31, but also restricts insertion of the insertion portion 54 into the second hole 32 from the first hole 31.

When the clamp-in valve 40 is used as a tire valve used in the tire valve unit, the insertion portion 54 of the clamp-in valve 40 is inserted into the insertion hole 28 of the attachment portion 24. In addition, the fitting protrusion 53 of the clamp-in valve 40 is fitted into the fitting recess 27 of the attachment portion 24. Then, the bolt 80 is screwed into an internal thread provided in the inner circumferential surface of the insertion portion 54 to constitute the tire valve unit 10A, in which the transmitter 20 and the clamp-in valve 40 are integrated with each other. At the time, each of the flat surfaces 57 of the insertion portion 54 is brought into contact with the inner circumferential surface of the first hole 31, and the valve-side opposed surfaces 56 of the fitting protrusion 53 are brought into contact with the corresponding opposed surfaces 30 of the fitting recess 27, thereby restricting turning of the clamp-in valve 40.

An operation of the transmitter 20, the clamp-in valve 40, and the tire valve units 10A and 10B of the present embodiment will now be described.

As illustrated in FIGS. 2 and 3, when the tire valve unit 10A provided with the clamp-in valve 40 is mounted on the wheel 11, the outer end portion 43 of the clamp-in valve 40 is inserted into an annular grommet 82 and the attachment hole 13 of the wheel 11. In the present embodiment, the outer end portion 43 is inserted from the inside of the wheel 11 to the outside the wheel 11. The grommet 82 is a component that seals inside and outside the tire 14 and is made of rubber, for example. The inside of the wheel 11 is a portion positioned inside the tire 14 when the tire 14 is mounted on the wheel 11, and the outside of the wheel 11 is a portion positioned outside the tire 14 when the tire 14 is mounted on the wheel 11.

Figure 9:
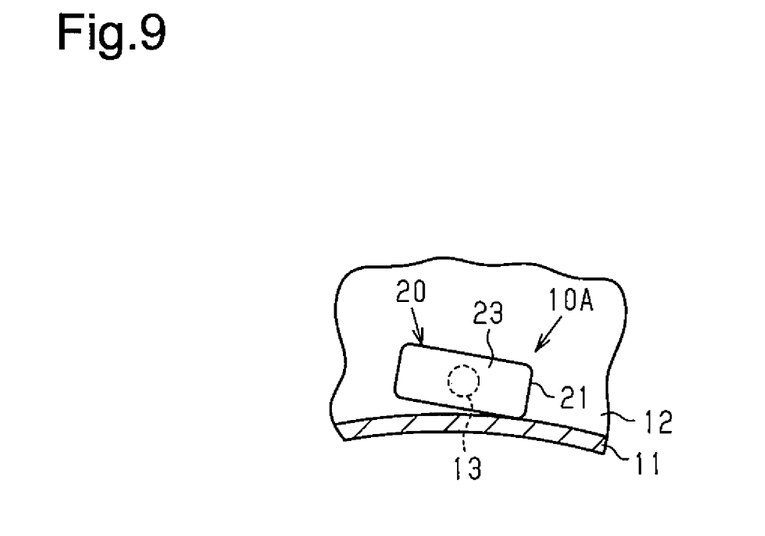
FIG. 9 illustrates movement of the transmitter when the tire valve unit using a clamp-in valve as the tire valve is mounted on the wheel.

Subsequently, the fastening nut 81 is screwed onto the fastening portion 45 extending through the attachment hole 13 to project outside the wheel 11. When the fastening nut 81 is turned, the fastening nut 81 and the tire valve unit 10A are turned together. As illustrated in FIG. 9, when the tire valve unit 10A is turned together with the fastening nut 81, a part of the case 21 is brought into contact with the wheel 11 to restrict turning of the tire valve unit 10A. When the fastening nut 81 is turned in this condition, the fastening nut 81 is screwed onto the fastening portion 45. Thus, force is applied to the attachment portion 24 from the clamp-in valve 40, so that the fastening nut 81 is screwed on the fastening portion 45 by using reaction force of the force above. When the fastening nut 81 is screwed, the sealability inside and outside the tire 14 is ensured by the grommet 82 sandwiched between the flange portion 44 and the wheel 11.

When the fastening nut 81 is screwed, torsion torque is caused in the clamp-in valve 40. This torsion torque applies force to the attachment portion 24 of the case 21 from the clamp-in valve 40. The force applied to the case 21 decreases as the distance from the central axis of the clamp-in valve 40 increases.

In the present embodiment, the case 21 is provided with the fitting recess 27, and the clamp-in valve 40 is provided with the fitting protrusion 53, which is fitted into the fitting recess 27. The force applied to the attachment portion 24 from the clamp-in valve 40 is applied not only to the opposed surfaces 30 of the fitting recess 27 through the corresponding valve-side opposed surfaces 56 of fitting protrusion 53, but also to the inner circumferential surface of the first hole 31 through the outer circumferential surface of the insertion portion 54. In a direction orthogonal to the central axis of the insertion hole 28, a part of the fitting protrusion 53 is positioned outward of the insertion hole 28. Thus, the force applied to the attachment portion 24 from the fitting protrusion 53 is reduced compared to a case in which the clamp-in valve 40 is attached to the attachment portion 24 by only inserting the insertion portion 54 of the clamp-in valve 40 into the insertion hole 28.

When the tire valve unit 10B provided with the snap-in valve 60 is mounted on the wheel 11, the outer projecting portion 62 of the snap-in valve 60 is inserted into the attachment hole 13 from the inside of the wheel 11. The body portion 71 is press-fitted into the attachment hole 13 while being elastically deformed. When the snap-in valve 60 is inserted into the attachment hole 13 until the mounting groove 72 reaches a position in the attachment hole 13, the mounting groove 72 and the attachment hole 13 are brought into close contact with each other to mount the tire valve unit 10B on the wheel 11. Then, the body portion 71 ensures sealability inside and outside the tire 14.

During traveling of the vehicle, the tire 14 and the wheel 11 rotate to cause centrifugal force to act on the tire valve unit 10B. The centrifugal force increases with increase in weight of the tire valve unit 10B. It is desired to reduce the weight of the tire valve unit 10B to prevent breakage of the body portion 71 due to centrifugal force.

In a structure in which only the insertion portion 54 of the clamp-in valve 40 or the inner projecting portion 63 of the snap-in valve 60 is inserted into the insertion hole 28 of the attachment portion 24 to enable attachment, the insertion portion 54 of the clamp-in valve 40 and the inner projecting portion 63 of the snap-in valve 60 have the same outline shape. In this case, when the inner projecting portion 63 of the snap-in valve 60 is made thin to reduce its weight, the insertion portion 54 of the clamp-in valve 40 also needs to be made thin. When the insertion portion 54 of the clamp-in valve 40 is made thin, the distance from the central axis of the clamp-in valve 40 to the contact portion on the case 21 is shortened to increase the force applied to the attachment portion 24 when the tire valve unit 10A is attached to the wheel 11. As a result, the attachment portion 24 may be deformed. When the attachment portion 24 is deformed, the clamp-in valve 40 cannot receive reaction force from the attachment portion 24 when the fastening nut 81 is screwed, whereby the tire valve unit 10A may not be able to be mounted on the wheel 11.

Meanwhile, when the insertion portion 54 of clamp-in valve 40 is thickened to reduce the force applied to the attachment portion 24, the inner projecting portion 63 of the snap-in valve 60 also needs to be thickened, thereby increasing the weight of the snap-in valve 60.

In the present embodiment, fitting between the fitting protrusion 53 and the fitting recess 27 prevents deformation of the attachment portion 24 when the clamp-in valve 40 is used. Thus, the thickness of inner projecting portion 63 of the snap-in valve 60 can be determined without any consideration of the strength of the attachment portion 24. As compared with a case in which the thickness of the inner projecting portion 63 is determined in consideration of the strength of the attachment portion 24 when the clamp-in valve 40 is attached, the inner projecting portion 63 can be made thinner to reduce the weight of the snap-in valve 60. This achieves, reduction in weight, which is required of the snap-in valve 60 and prevention of deformation of the attachment portion 24, which is required of the clamp-in valve 40.

In the tire valve unit 10A provided with the clamp-in valve 40, a portion to which force is applied due to centrifugal force is the valve stem 41 made of metal, so that weight reduction to reduce the centrifugal force does not need to be considered. In the tire valve unit 10B provided with the snap-in valve 60, the snap-in valve 60 is press-fitted into the insertion hole 28 to be mounted on the wheel 11, so that the force caused by torsion torque does not need to be considered.

The above-described embodiment achieves the following advantages.

(1) Both the snap-in valve 60 and the clamp-in valve 40 are allowed to be individually attached to the single attachment portion 24, so that the same transmitter 20 can be used regardless of whether which of the snap-in valve 60 and the clamp-in valve 40 is used as a tire valve.

The attachment portion 24 includes the insertion hole 28, into which the inner projecting portion 63 of the snap-in valve 60 or the insertion portion 54 of the clamp-in valve 40 is inserted, and the fitting recess 27, into which the fitting protrusion 53 of clamp-in valve 40 is fitted. In the direction orthogonal to the central axis of the insertion hole 28, the fitting recess 27 extends outward beyond the insertion hole 28, so that a part of the fitting recess 27 is positioned outside the insertion hole 28. When the clamp-in valve 40 is used as a tire valve, the fitting protrusion 53 is fitted into the fitting recess 27. This enables reduction in the force applied to the attachment portion 24 from the clamp-in valve 40 when the tire valve unit 10A is mounted on the wheel 11. Thus, deformation of the attachment portion 24 is reduced.

(2) Fitting between the fitting recess 27 and the fitting protrusion 53 prevents deformation of the attachment portion 24 when the clamp-in valve 40 is mounted on the wheel 11. Thus, it is possible to determine the thickness of the inner projecting portion 63 of the snap-in valve 60 to be inserted into the insertion hole 28 without any consideration of the thickness of the clamp-in valve 40. This allows the snap-in valve 60 to be reduced in weight, so that the force applied to the body portion 71 due to centrifugal force is reduced. As a result, breakage and deformation of the body portion 71 are prevented to extend the life of the tire valve unit 10B provided with the snap-in valve 60.

(3) The clamp-in valve 40 includes the insertion portion 54 to be inserted into the insertion hole 28. The force applied to attachment portion 24 from the clamp-in valve 40 is also applied to the inner surface of the insertion hole 28 through the insertion portion 54. Thus, the force applied to the attachment portion 24 from the clamp-in valve 40 is divided into force applied to the fitting recess 27 through the fitting protrusion 53 and force applied to the inner surface of the insertion hole 28 through the insertion portion 54, so that the force is prevented from being applied in a concentrated manner.

(4) Both the snap-in valve 60 and the clamp-in valve 40 are allowed to be individually attached to the single attachment portion 24, so that the same transmitter 20 can be used without individually providing an attachment portion for the snap-in valve 60 and an attachment portion for the clamp-in valve 40. Thus, as compared with a case in which an attachment portion for the snap-in valve 60 and an attachment portion for the clamp-in valve 40 are individually provided, the weight of the case 21 is further reduced.

The present embodiment may be modified as follows.

Figure 10:
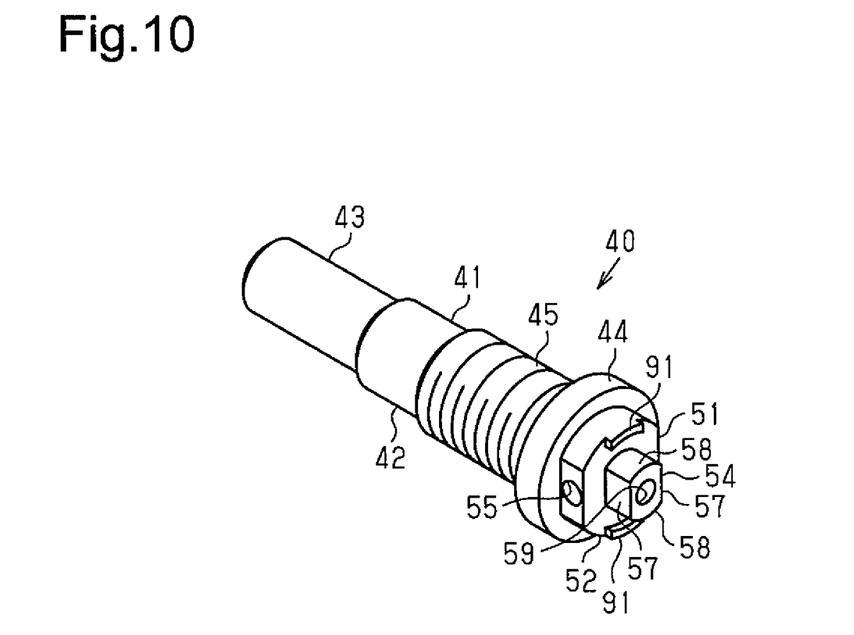
FIG. 10 is a perspective view of a modification of a clamp-in valve.

As illustrated in FIG. 10, fitting protrusions 91 may be separated from the insertion portion 54. The clamp-in valve 40 illustrated in FIG. 10 includes the insertion portion 54 provided at an end face of the continuous portion 52, and two fitting protrusions 91. Each of the fitting protrusions 91 is positioned outward of the insertion portion 54 in the direction orthogonal to the axial direction of the valve stem 41. The two fitting protrusions 91 are provided at respective positions away from the insertion portion 54, and are positioned on the opposite sides of the insertion portion 54. This clamp-in valve 40 is attached to the transmitter 20 illustrated in FIG. 11.

Figure 11:
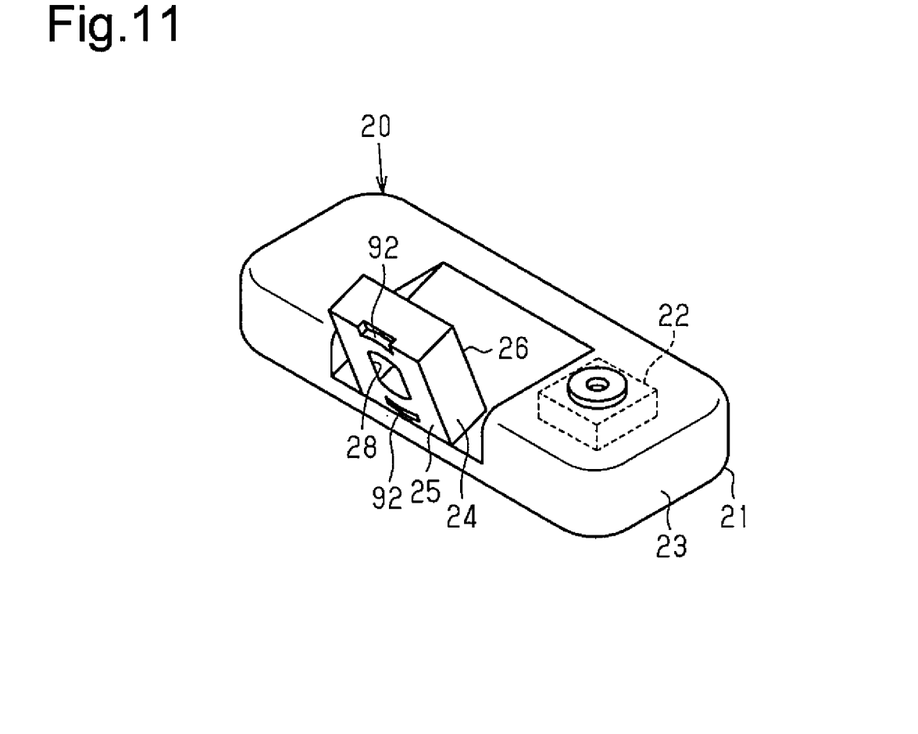
FIG. 11 is a perspective view of a modification of a transmitter.

As illustrated in FIG. 11, the attachment portion 24 of the transmitter 20 includes the insertion hole 28 and two fitting recess 92. The two fitting recess 92 are separated from the insertion hole 28. Each of the fitting recesses 92 is positioned outward of the insertion hole 28 in the direction orthogonal to the central axis of the insertion hole 28. Each of the fitting protrusions 91 is fitted into the corresponding one of the fitting recesses 92.

Figure 12:
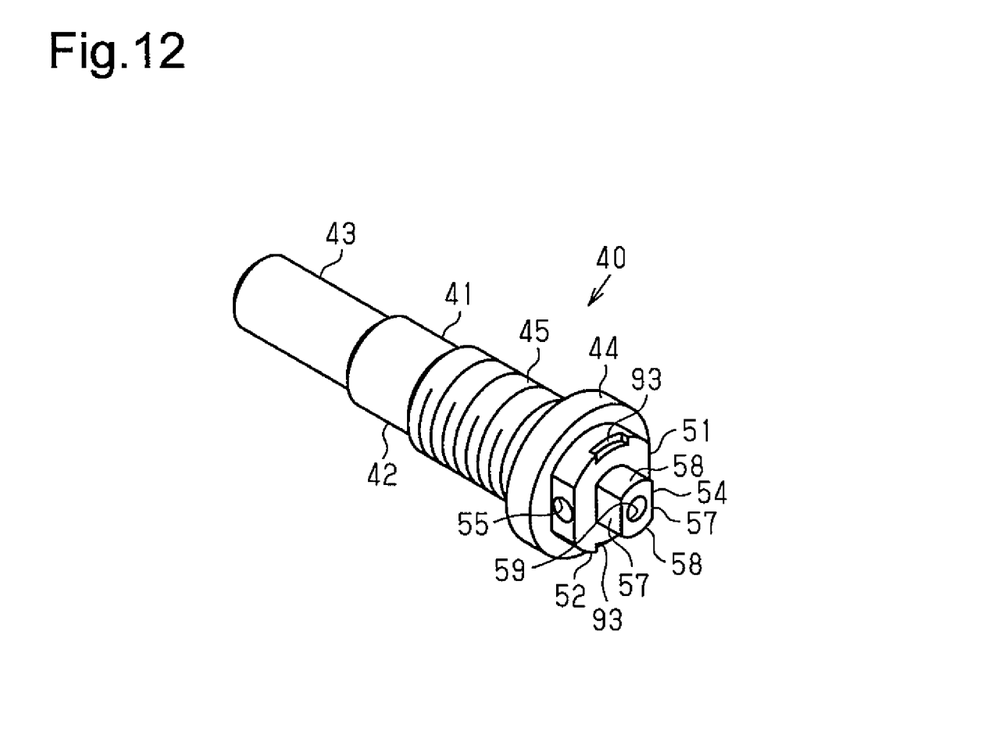
FIG. 12 is a perspective view of a modification of a clamp-in valve.

As illustrated in FIG. 12, the clamp-in valve 40 may include fitting recesses 93 instead of fitting protrusions. Each fitting recess 93 is recessed from an end face of continuous portion 52 in the axial direction of the valve stem 41. This clamp-in valve 40 is attached to the transmitter 20 illustrated in FIG. 13.

Figure 13:
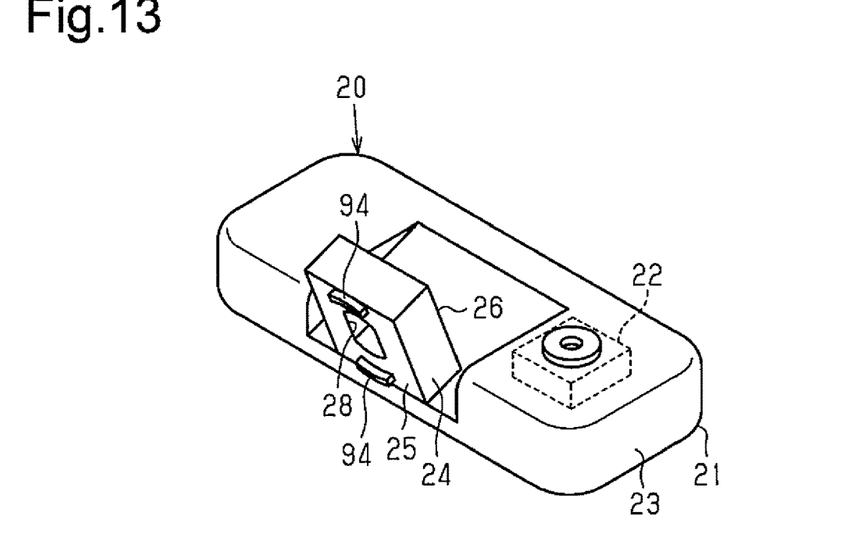
FIG. 13 is a perspective view of a modification of a transmitter.

As illustrated in FIG. 13, the attachment portion 24 of the transmitter 20 may include fitting protrusions 94 instead of fitting recesses. The fitting protrusions 94 are positioned outward of the insertion hole 28 in the direction orthogonal to the central axis of the insertion hole 28. In this case, the fitting protrusions 94 of the attachment portion 24 are fitted into the fitting recesses 93 of the clamp-in valve 40. Thus, any shape is available to a case-side fitting portion provided in the attachment portion 24 and a valve-side fitting portion provided in the clamp-in valve 40, in the relationship of projections and depressions, as long as they are fitted to each other. For example, each of the attachment portion 24 and the clamp-in valve 40 may include both of fitting protrusions and fitting recesses.

Figure 14:
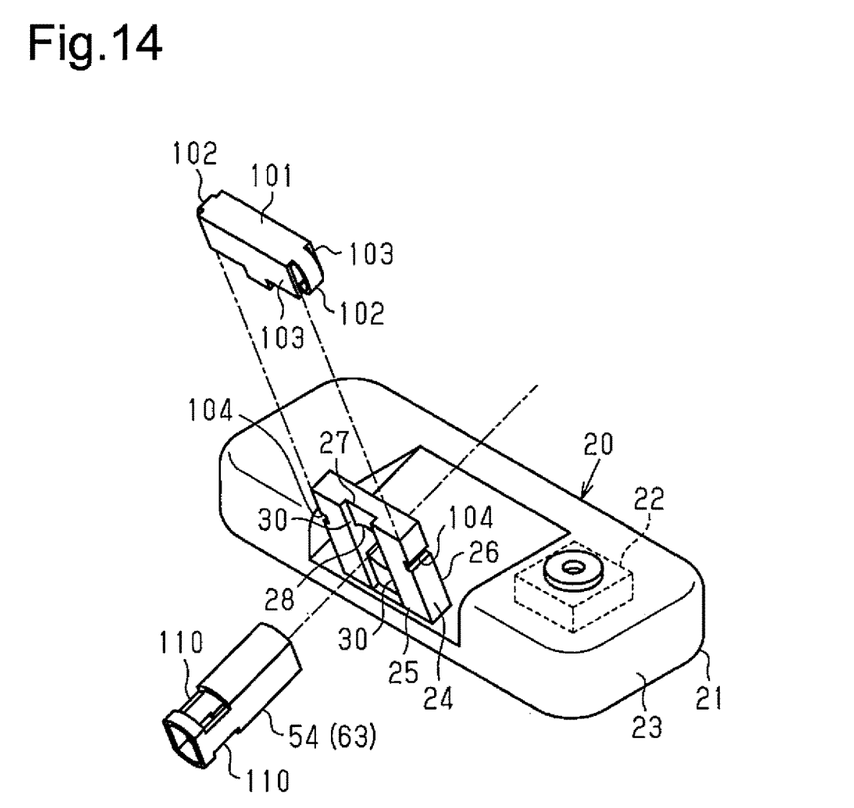
FIG. 14 is a perspective view of a modification of a fixing tool.

As illustrated in FIG. 14, a component other than the bolt 80 may be used as a fixing tool 100. As illustrated in FIG. 14, the fixing tool 100 includes a rectangular plate-shaped coupling portion 101, arm portions 102 extending from a pair sides extending in the transverse direction of the coupling portion 101, and locking portions 103 extending from a pair sides extending in the longitudinal direction of the coupling portion 101. The fixing tool 100 is made of metal. The two arm portions 102 extend in the same direction from places of the coupling portion 101 while being curved. The arm portions 102 are hooked to grooves 104 provided in the attachment portion 24 to be fixed to the attachment portion 24.

When the fixing tool 100 described above is used, each of the inner projecting portion 63 of the snap-in valve 60 and the insertion portion 54 of the clamp-in valve 40 is provided with a through-hole 110 extending through the circumferential wall thereof.

The fixing tool 100 is provided such that the attachment portion 24 is inserted between the locking portions 103. Then, the locking portions 103 project into the inner projecting portion 63 or the insertion portion 54 through the through-hole 110. This restricts axial movement of the snap-in valve 60 or the clamp-in valve 40, and the snap-in valve 60 or the clamp-in valve 40 is attached to the case 21. When the fixing tool 100 described above is used, the insertion hole 28 has the same size throughout the range from the first surface 25 to the second surface 26. Specifically, the size allows insertion of each of the inner projecting portion 63 and the insertion portion 54.

The clamp-in valve 40 does not need to include the insertion portion 54. In this case, fitting between the fitting recess 27 and the fitting protrusion 53 allows the clamp-in valve 40 to be attached to the attachment portion 24.

Each of the inner projecting portion 63 of the snap-in valve 60 and the insertion portion 54 of the clamp-in valve 40 may be in the shape of a perfect circle as long as turning of each of the tire valves is restricted when the bolt 80 is individually screwed into the inner projecting portion 63 of the snap-in valve 60 and the insertion portion 54 of the clamp-in valve 40. Likewise, the insertion hole 28 of the attachment portion 24 may be in the shape of a perfect circle. Even when a fixing tool that does not apply turning force to each of the tire valves is used, each of the inner projecting portion 63 of the snap-in valve 60 and the insertion portion 54 of the clamp-in valve 40 may be in the shape of a perfect circle.

Each of the inner projecting portion 63 of the snap-in valve 60 and the insertion portion 54 of the clamp-in valve 40 may be in a polygonal shape such as a quadrangular shape or in an elliptic shape. In this case, the shape of the insertion hole 28 is also changed so as to coincide with the shape of the inner projecting portion 63 and the insertion portion 54.

The valve attachment portion 51 does not need to include the continuous portion 52. In this case, the fitting protrusion 53 is provided continuously to the flange portion 44. The vent hole 66 is provided in any one of the flange portion 44, the fitting protrusion 53, and the insertion portion 54.

The outline of each of the inner projecting portion 63 and the insertion portion 54 does not need to be similar to the shape of the first hole 31 of the insertion hole 28 as long as each of the tire valves can be attached to the attachment portion 24.

The fitting recess 27 may extend in a direction intersecting with the extending direction of the attachment portion 24. In addition, the fitting recess 27 does not need to extend to reach the edge of the attachment portion 24. That is, the fitting recess 27 may have any size and shape as long as the fitting protrusion 53 can be fitted.

The attachment portion may be a part of the case 21, such as a part of a wall portion constituting the accommodation portion 23.

As a detecting section, a sensor other than the pressure sensor 22, such as a temperature sensor that detects temperature in the tire 14, and an acceleration sensor that detects centrifugal force acting on a wheel, may be used.

DESCRIPTION OF THE REFERENCE NUMERALS 10A, 10B . . . tire valve unit, 20 . . . transmitter (tire condition detecting device), 21 . . . case, 22 . . . pressure sensor (detecting section), 24 . . . attachment portion, 27 . . . fitting recess (case-side fitting portion), 28 . . . insertion hole, 40 . . . clamp-in valve, 53 . . . fitting protrusion (valve-side fitting portion), 60 . . . snap-in valve, 80 . . . bolt (fixing tool).

The invention claimed is:

1. A tire condition detecting device comprising:
a case;
a detecting section, which is accommodated in the case to detect a condition of a tire;
an attachment portion provided in the case;
an insertion hole, which is provided in the attachment portion and is configured to allow a snap-in valve to be inserted into the insertion hole such that turning of the snap-in valve is restricted, the insertion hole being further configured to allow an insertion portion of a clamp-in valve to be inserted into the insertion hole such that turning of the clamp-in valve is restricted; and
a case-side fitting portion, which is provided in the attachment portion to be positioned outward of the insertion hole in a direction orthogonal to a central axis of the insertion hole, and is configured to be fitted to the clamp-in valve to restrict turning of the clamp-in valve,
wherein the snap-in valve inserted into the insertion hole or the clamp-in valve fitted to the case-side fitting portion is attached to the case with a fixing tool.

2. A clamp-in valve configured to be attached to a tire condition detecting device, wherein the tire condition detecting device includes
a case,
a detecting section, which is accommodated in the case to detect a condition of a tire,
an attachment portion provided in the case,
an insertion hole, which is provided in the attachment portion and is configured to allow a snap-in valve to be inserted into the insertion hole such that turning of the snap-in valve is restricted, and
a case-side fitting portion, which is provided in the attachment portion to be positioned outward of the insertion hole in a direction orthogonal to a central axis of the insertion hole,
the clamp-in valve comprising:
a valve stem;
an insertion portion configured to be inserted into the insertion hole such that turning of the clamp-in valve is restricted; and
a valve-side fitting portion configured to be fitted to the case-side fitting portion to restrict turning of the clamp-in valve,
wherein the clamp-in valve is configured to be attached to the case with a fixing tool with the case-side fitting portion and the valve-side fitting portion fitted to each other.

3. A tire valve unit comprising:
a tire condition detecting device; and
a tire valve attached to the tire condition detecting device, wherein
the tire condition detecting device includes
a case;
a detecting section, which is accommodated in the case to detect a condition of a tire,
an attachment portion provided in the case,
an insertion hole, which is provided in the attachment portion and is configured to allow a snap-in valve serving as the tire valve to be inserted into the insertion hole such that turning of the snap-in valve is restricted, the insertion hole being further configured to allow an insertion portion of a clamp-in valve serving as the tire valve to be inserted into the insertion hole such that turning of the clamp-in valve is restricted, and
a case-side fitting portion, which is provided in the attachment portion to be positioned outward of the insertion hole in a direction orthogonal to a central axis of the insertion hole, and is configured to allow a valve-side fitting portion of the clamp-in valve to be fitted to the case-side fitting portion to restrict turning of the clamp-in valve, and
a fixing tool configured to fix, to the case, the snap-in valve inserted into the insertion hole or the clamp-in valve fitted to the case-side fitting portion.

4. The tire condition detecting device according to claim 1, wherein the case-side fitting portion is separated from the insertion hole in the direction orthogonal to the central axis of the insertion hole without being continuous with the insertion hole.

5. The clamp-in valve according to claim 2, wherein the valve-side fitting portion is separated from the insertion portion in a direction orthogonal to a central axis of the valve stem without being continuous with the insertion portion.

6. The tire valve unit according to claim 3, wherein the case-side fitting portion is separated from the insertion hole in the direction orthogonal to the central axis of the insertion hole without being continuous with the insertion hole.

* * * * *